United States Patent Office 3,420,205
Patented Jan. 7, 1969

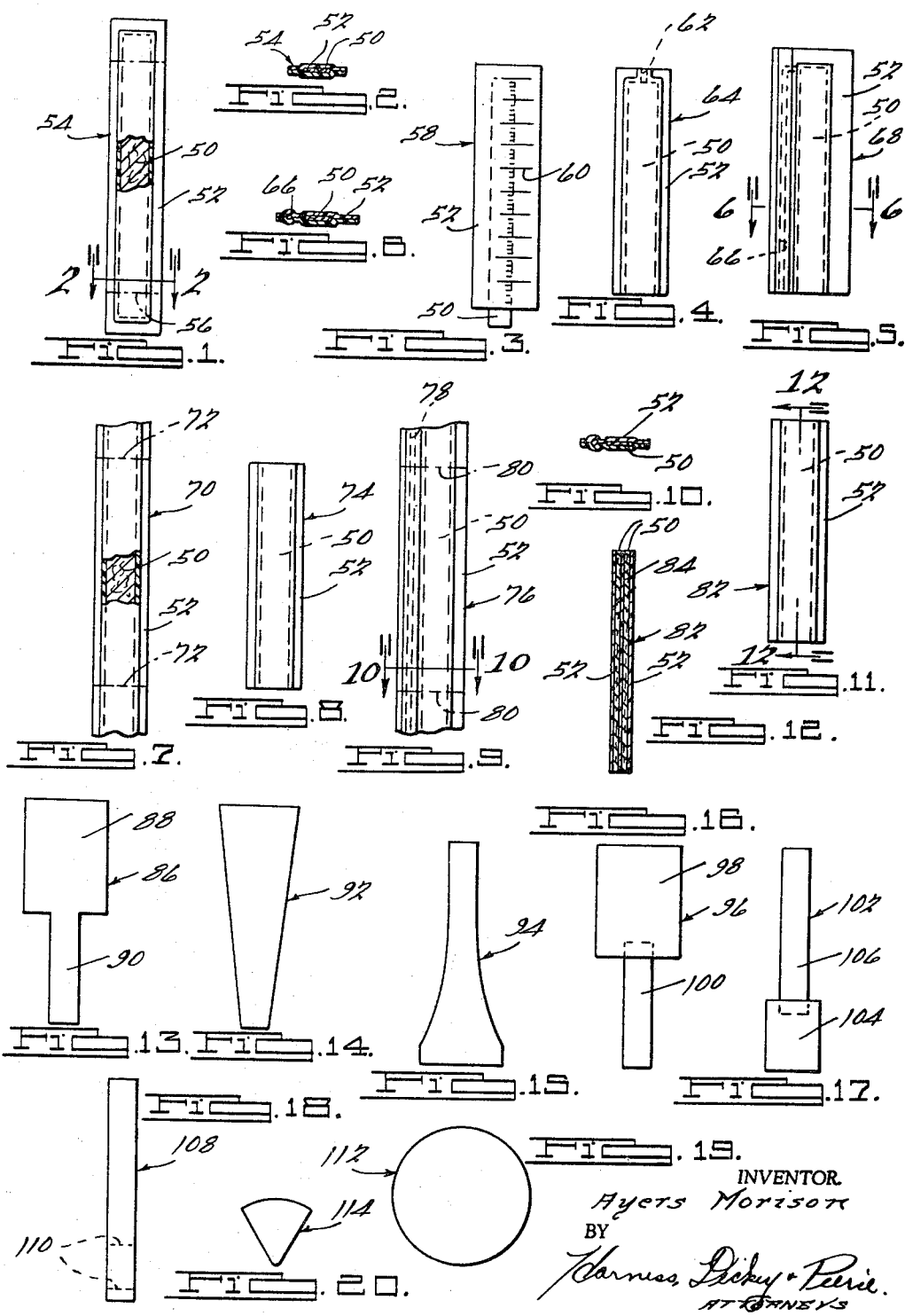

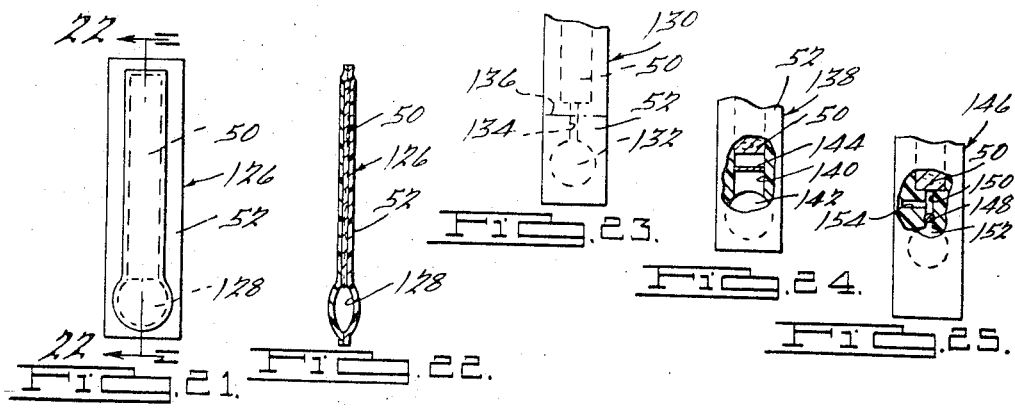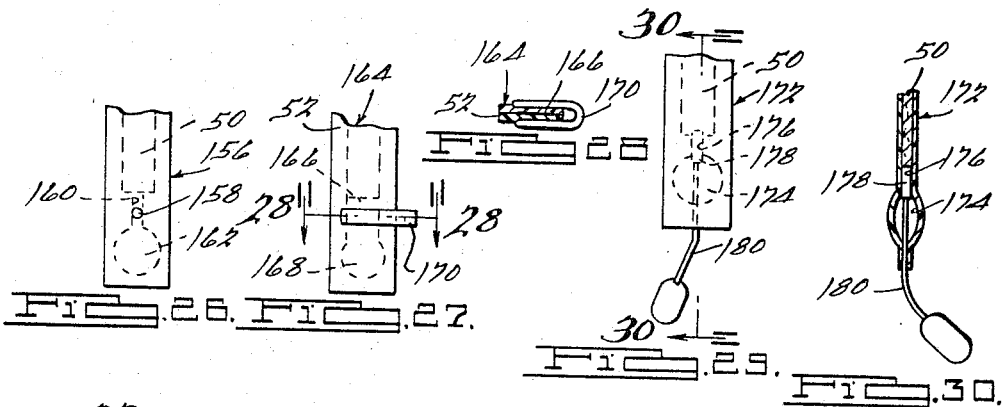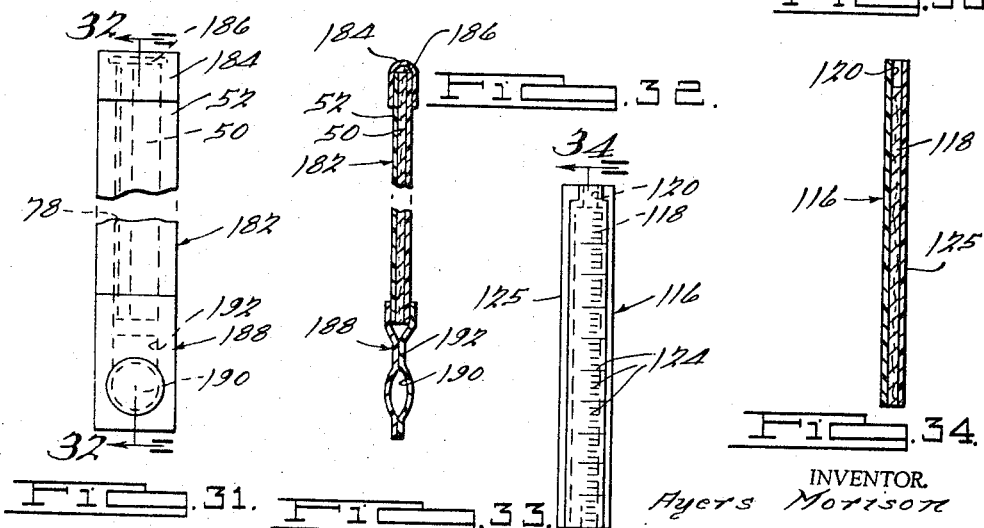

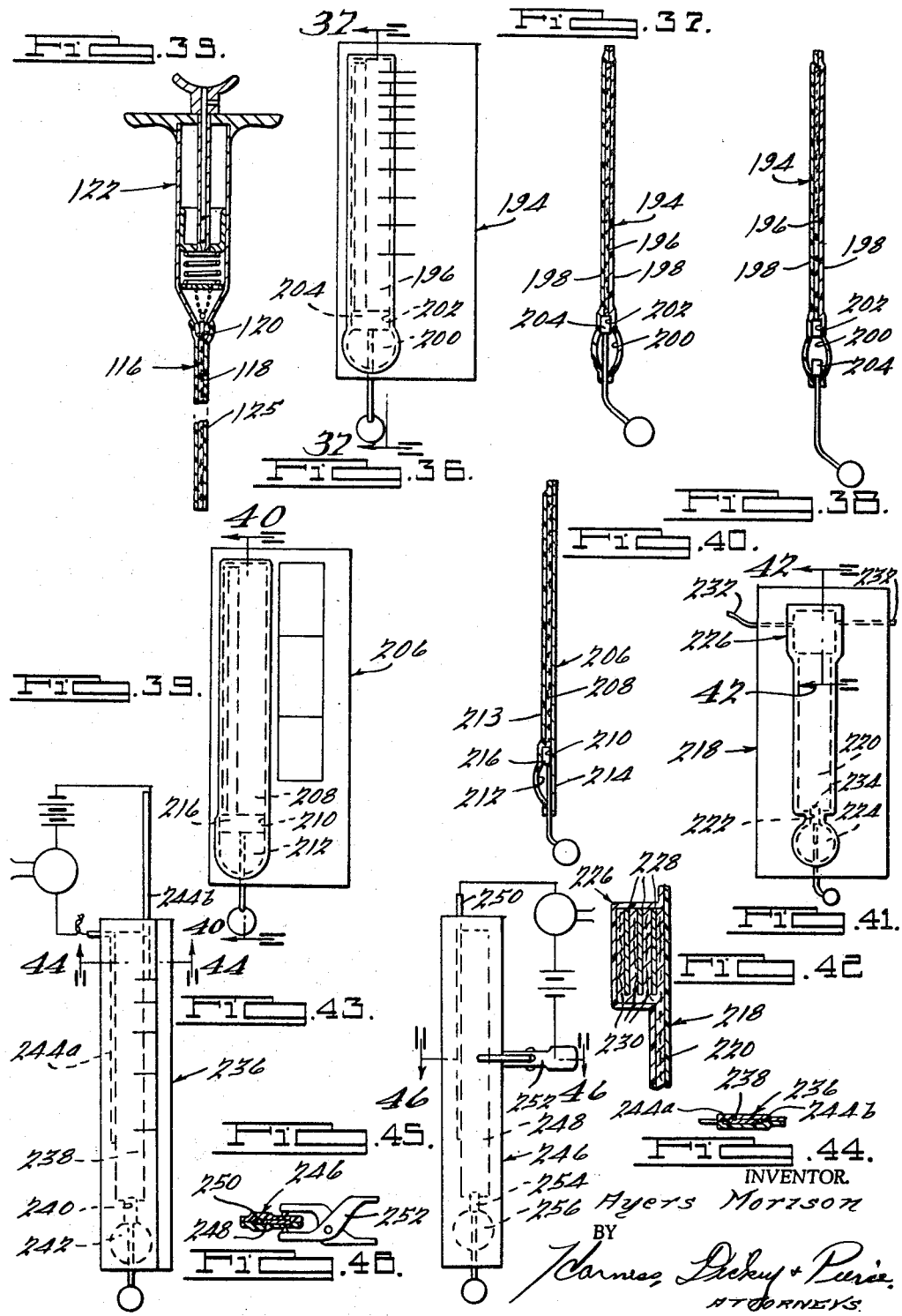

3,420,205
INDICATING DEVICE
Ayers Morison, Grosse Pointe, Mich., assignor to Miles Laboratories, Inc., Elkhart, Ind., a corporation of Indiana
Original application Dec. 18, 1961, Ser. No. 160,127. Divided and this application Mar. 23, 1966, Ser. No. 590,106
U.S. Cl. 116—114                              14 Claims
Int. Cl. G01d 1/00

ABSTRACT OF THE DISCLOSURE

An indicator device suitable for indicating elapsed time and time-temperature relationships consisting of a porous capillary material enclosed within an impervious sheath disposed in intimate contact with the surface thereof and a reservoir containing a fluid of controlled properties which is adapted to be opened to communicate with a selected point of the capillary material to initiate a measuring function by the absorption of the fluid in a guided direction through the capillary material.

---

*Cross reference to related applications*

This application is a divisional application of the copending application of Ayers Morison, Ser. No. 160,127, filed Dec. 18, 1961, for "Indicating Device."

The present invention broadly relates to indicating devices, and more particularly to an improved indicating device which in various shapes, combinations, and with various impregnants is adaptable to enable visual or electrical indication of the measurement of a variety of parameters such as time, temperature, temperature-time relationships, physical relationships such as viscosity or surface tension of liquids, and for chemical relationships such as analytical determinations of concentrations or relative concentrations of components in a solution, for analyzing and separating components of a liquid emulsion or dispersion or other fluids such as air, and the like.

In accordance with the present invention, an indication is obtained which enables substantially accurate correlations to be made between the rate and/or distance of travel of a fluid or a component of the fluid along a sheathed wick in relationship to the specific characteristics of the fluid or component and the temperature and variations in the temperature of the environment in which the indicating device is used. The present invention enables a wick to be employed in combination with fluids of a controlled composition and possessing selected physical properties as an indicator device providing for accurate and inexpensive means for furnishing information and data which heretofore could not be accurately obtained or could be obtained only through relatively elaborate, time-consuming and costly measuring techniques.

It is, accordingly, a primary object of the present invention to provide an improved indicating device comprising a capillary material enclosed within an impervious protective sheath or covering material which is disposed in intimate contact with the surfaces of the capillary material providing therewith a wick having a controlled wicking action.

Still another object of the present invention is to provide an improved indicating device which includes a capillary material enclosed within an impervious protective sheath which substantially completely eliminates the effect of gravity or motion upon the rate of absorption of fluid therealong, which eliminates contamination and evaporation of the fluid absorbed by the wick, which provides for a uniform distribution of fluid therealong, which directs, controls and limits the amount of fluid which is absorbed by the wick with respect to the wick geometry, and which enables accurate measurements and analyses to be made using a comparatively small sample of fluid.

Still another object of the present invention is to provide an improved indicating device of the indicated character wherein at least a portion of the impervious sheath or covering material is sufficiently transparent so as to enable visual inspection of the position of the indicator substance or fluid in the wick in relation to appropriate calibrations positioned on or adjacent to the wick and oriented with respect to the absorptive direction of the fluid.

A further object of the present invention is to provide an improved indicating device including a sheathed wick wherein the capillary material therein is of a preselected constant and/or variable shape and porosity along its length to achieve a desired uniformity or controlled variation in the wicking action thereof.

A still further object of the present invention is to provide an elapsed time indicator incorporating therein a sheathed wick calibrated to measure time and compensated to substantially completely eliminate the effect of temperature variations over a preselected range, the timing duration of which is established in manufacture.

Yet still another object of the present invention is to provide a combination temperature-elapsed time indicator device employing a sheathed wick and which device is adapted to indicate the elapsed time period since the article was subjected to a preselected temperature.

Yet a still further object of the present invention is to provide a shelf-life indicator device comprising a temperature sensitive timer whereby the rate of absorption of a liquid is effected by the ambient temperature and is operable to correlate the elapsed time and variations in temperature by employing selected liquids and a controlled geometry and porosity of the sheathed capillary material to accurately determine the shelf-life, or freshness or suitability for sale of perishable articles which are subject to spoilage or deterioration on aging by an amount determined by their thermal history and/or age such as frozen foods, meats, photographic films, pharmaceuticals, and the like.

Another object of the present invention is to provide an indicator device incorporating a sheathed wick and which device employs an electrically conductive liquid which on attaining a predetermined position along the wick is operative to complete an electric circuit or to produce an electric signal as an indication of the completion of a measured event.

Still another object of the present invention is to provide an analytical indicator device employing a sheathed wick and which device is suitable for the accurate analyses of the concentration of a simple solution, the relative concentration of components in a multiple solution, to measure the viscosity or surface tension of a variety of liquids, and to perform analyses and separations on liquid emulsions, colloids, and dispersions.

Yet still another object of the present invention is to provide an indicator device employing a sheathed wick wherein the capillary material is impregnated with a suitable indicator dye whereupon absorption of a fluid to be tested effects a color change in the indicator dye or a movement of the indicator dye, and the length of the colored portion or spacing thereof from one end of the wick of the indicator dye is indicative of the characteristics of the solution or fluid such as the acidity thereof, for example.

Yet a still further object of the present invention is to provide a sheathed wick indicator device the capillary material of which has been rendered reactive with the fluid absorbed and/or impregnated with an indicator which changes color to show the amount of reactive capillary material which has reacted with the fluid.

Yet still another object of the present invention is to provide a sheathed wick indicator device, the sensitivity of which can be controlled and established in manufacture by controlling the amount of a reactive impregnant, or controlling the condition, such as the acidity or alkalinity, for example, of the capillary material.

Still another object of the present invention is to provide a sheathed wick construction and an indicator device incorporating said sheathed wick which is of simple design, of economical manufacture, of extremely versatile use, and which, because of its low cost, can either be discarded after use or can be readily filed as a semi-permanent record.

The foregoing and other objects and advantages of the present invention are achieved by providing a material having capillary qualities and enclosing the capillary material in an impervious protective sheath which is disposed in intimate contact with the exterior surfaces of the capillary material and thereafter introducing a liquid of controlled physical characteristics including viscosity, specific gravity, and surface tension at a preselected point of the capillary material wherein the resultant travel of the liquid along the wick is indicative of the elapsed time and/or environment, or alternatively, introducing a fluid to be analyzed at a point of the capillary material whereby the travel of the fluid or an indicating agent is indicative of the characteristics of the fluid or media in which the indicator device is disposed. The fluid which is supplied to the capillary material can be derived from a remote fluid supply such as a test solution or from a liquid reservoir intergrally contained in an indicator device incorporating the capillary material which either on dipping of the wick into the test solution or on the opening of a suitable valve or the movement or rupture of a blocking member releases the fluid into absorptive contact with the capillary material to initiate the wicking action. It is also contemplated within the scope of the present invention that the capillary material can be impregnated with or modified by suitable additives which are adapted to become dissolved in or modified chemically by the liquid as it advances along the capillary material effecting either a color change, a color migration, or a modification in the physical properties of the liquid. The liquid can be controlled in composition and physical behavior with respect to environment which in correlation with a controlled geometrical configuration and porosity of the capillary material produces the desired wicking action along each incremental length of the capillary material serving as an indicator of the particular parameter being measured.

Other objects and advantages of the present invention will become apparent from the following detailed description taken in conjunction with the accompanying drawings, wherein:

FIGURE 1 is a plan view of a sheathed wick incorporating a capillary material of a preselected geometrical configuration laminated between two transparent plastic films;

FIG. 2 is a transverse sectional view through the sheathed wick shown in FIGURE 1 and taken substantially along the line 2—2 thereof;

FIG. 3 is a plan view of an alternate satisfactory sheathed wick wherein the capillary material projects from one end of the sheath;

FIG. 4 is a plan view of an individually sheathed wick provided with a venting aperture at the upper end thereof;

FIG. 5 is a plan view of an alternate satisfactory individually sheathed wick employing a venting aperture disposed in communication with the upper end portion of the wick and extending between the plastic films to a point adjacent the opposite end thereof;

FIG. 6 is a transverse sectional view of the sheathed wick shown in FIG. 5 and taken substantially along the line 6—6 thereof;

FIG. 7 is a plan view of a continuous strip of a capillary material sheathed within two plastic films which is adapted to be cut transversely into a plurality of sheathed wicks of the desired length;

FIG. 8 is a plan view of a sheathed wick having both ends thereof exposed to the atmosphere such as obtained from cutting a length from the continuous strip shown in FIG. 7;

FIG. 9 is a plan view of a continuous strip of a sheathed wick incorporating therein a venting aperture extending parallel to the capillary material;

FIG. 10 is a transverse sectional view of the strip shown in FIG. 9 and taken substantially along the line 10—10 thereof;

FIG. 11 is a plan view of a composite sheathed wick incorporating two strips of capillary material disposed in overlying relation and separated by an intervening impervious film;

FIG. 12 is a longitudinal sectional view through the composite sheathed wick shown in FIG. 11 and taken substantially along the line 12—12 thereof;

FIGS. 13–20 are plan views of alternate satisfactory geometrical configurations and composite constructions of the capillary material to obtain controlled variations in the absorption characteristics thereof;

FIG. 21 is a plan view of a typical temperature-sensitive indicator device employed for indicating freshness of perishable materials and incorporating a sheathed wick and a liquid reservoir adjacent to one end thereof;

FIG. 22 is a longitudinal sectional view of the structure shown in FIG. 21 and taken substantially along the line 22—22 thereof;

FIG. 23 is a fragmentary plan view of a sheathed wick incorporating a self-contained liquid reservoir which is connected by a conduit which is selectively opened by unfolding the sheath along the dotted fold line;

FIG. 24 is a fragmentary plan view of a sheathed wick incorporating a self-contained liquid reservoir employing a closure member between the reservoir and the end of the capillary material which is adapted to be ruptured enabling initiation of the absorbing action;

FIG. 25 is a fragmentary plan view of a sheathed wick incorporating a self-contained liquid reservoir wherein a fusible material is employed to prevent flow of the liquid to the wick until a preselected temperature has been exceeded;

FIG. 26 is a fragmentary plan view of a sheathed wick incorporating a self-contained liquid reservoir wherein a frangible plug is employed for releasing the liquid to initiate the absorptive action;

FIG. 27 is a fragmentary plan view of a sheathed wick incorporating a self-contained liquid reservoir wherein a clip is provided for preventing absorption of the liquid until removal thereof;

FIG. 28 is a transverse sectional view through the clip mechanism and sheathed wick shown in FIG. 27 and taken along the line 28—28 thereof;

FIG. 29 is a fragmentary plan view of a sheathed wick incorporating a self-contained liquid reservoir provided with a stopper valve which, on actuation, releases the liquid to initiate the absorptive action;

FIG. 30 is a longitudinal sectional view of the sheathed wick shown in FIG. 29 and taken along the line 30—30 thereof;

FIG. 31 is a plan view of a sheathed wick incorporating a self-contained liquid reservoir comprising a sheathed wick such as derived from a continuous strip as shown in FIG. 7 which is closed at the ends thereof by a cap and base containing an integral liquid reservoir.

FIG. 32 is a longitudinal sectional view of the sheathed wick shown in FIG. 31 and taken along the line 32—32 thereof;

FIG. 33 is a plan view of a sheathed wick incorporating calibrations along the length of the wick and provided with a port in the upper end thereof for drawing a predetermined volume of fluid through the capillary material;

FIG. 34 is a longitudinal sectional view of the sheathed wick shown in FIG. 33 and taken along the line 34—34 thereof;

FIG. 35 is a sectional view of the sheathed wick shown in FIGS. 33 and 34 having a syringe positioned in the port at the upper end thereof for drawing a preselected volume of sample through the capillary material;

FIG. 36 is a plan view of a typical time indicator device employing a sheathed wick and a self-contained liquid reservoir;

FIG. 37 is a longitudinal sectional view of the indicator device shown in FIG. 36 taken substantially along the line 37—37 thereof and illustrating the plug in the closed position;

FIG. 38 is a longitudinal sectional view similar to that shown in FIG. 37 with the plug moved to the open position releasing liquid to become absorbed in the capillary material;

FIG. 39 is a plan view of an indicator device incorporating a sheathed wick and an integral liquid reservoir therein;

FIG. 40 is a longitudinal sectional view through the indicator device shown in FIG. 39 and taken substantially along the line 40—40 thereof;

FIG. 41 is a plan view of an indicator device incorporating a self-contained liquid reservoir and a sheathed wick which is operative on the completion of a measuring function to generate an electric signal current;

FIG. 42 is a fragmentary longitudinal sectional view through the battery portion of the indicator device shown in FIG. 41 and taken along the line 42—42 thereof;

FIG. 43 is a plan view of an indicator device incorporating a sheathed wick and a self-contained liquid reservoir which, on completion of a measuring function, is adapted to close an electrical circuit which in turn enables the energization of a suitable control relay;

FIG. 44 is a transverse sectional view through the indicator device shown in FIG. 43 and taken along the line 44—44 thereof;

FIG. 45 is a plan view of an alternate satisfactory indicator device adapted to close an electrical circuit on the completion of a measuring function from that shown in FIG. 43; and FIG. 46 is a transverse sectional view through the indicator device shown in FIG. 45 and taken along the line 46—46 thereof.

The capillary material employed in the sheathed wick construction comprising the present invention can comprise any porous material or media through which a fluid or solid can be absorbed, or caused to be absorbed, imbibed, assimilated or passed through by either solvation, diffusion, sublimation, or capillary action. Principally, the wick material possesses capillary qualities produced by a filamented capillaceous, porous, or interconnected cellular structure characterized by connected voids of sufficiently small size to induce the progressive taking up of a fluid by absorption. Suitable capillary materials for construction of the sheathed wick include finely particulated granular materials, spongy or cellular materials and fibrous materials such as cellulosic and synthetic fibrous networks such as cloth, paper, and the like, having a large internal interconnected surface area with respect to its volume. Of the foregoing materials, the capillary material or wick is preferably comprised of a paper of controlled physical and chemical properties either employing cellulosic, synthetic or glass fibers which is of sufficient uniformity and homogeneity with respect to porosity, density, and chemical composition so that it can be commercially reproduced. The specific density, hardness, surface characteristics, thickness, weight, composition, filler content, and chemical nature, etc. can be varied so as to achieve optimum absorptive action for each specific measuring function.

The wick material can also be impregnated with suitable additives or chemicals as will be subsequently described, which effect a change in the rate of absorption of the absorbed fluids, or which effects a change in the absorption characteristics of the absorbed fluid, or which produce a color change on reaction with the absorbed fluid to accentuate the distance of the penetration, which react with one or more components of the absorbed fluid to provide an indication of the amount and/or condition of the reacted or unreacted portion of the fluid absorbed by the wick, or which produce changes in the concentration of the dissolved impregnants in the fluids.

It is also contemplated within the scope of the present invention that the wick can be of a composite construction employing wicking materials of dissimilar physical and chemical characteristics to produce a controlled change in the manner and amount of absorption of the fluid therethrough. Alternatively, the wick itself may comprise one material which is geometrically shaped to produce controlled changes in manner or amount of absorption or to produce predictable changes in rate of the travel of the liquid absorbed thereby.

The covering material employed for enclosing the capillary or wick material within a protective sheath can comprise any suitable material which is impervious to the fluid and which itself will not substantially penetrate the pores of the wick material. The use of a sheath around the wick material provides for the elimination of evaporation of the absorbed liquids, the elimination of the "surface effect" comprising a progressively decreasing thickness of a layer of liquid along the outer surface of the wick as effected by position of the wick which seriously affects the uniform wicking action thereof, the elimination of uncontrolled capillary action along the length of the wick, the elimination of uncontrolled elongation of the wick as a result of the wetting and absorption of liquid in the porous structure thereof, the elimination of low structural strength and particularly the low wet strength of the wick material, the elimination of contamination and staining of the liquid in the wick material, and which strictly limits the amount of material absorbed by the wick and directs and controls the amount and direction of absorption in relation to wick geometry and point of entrance of the fluid.

The particular material of which the covering material or protective sheath is composed is not critical provided that it itself is not porous and is substantially impervious to the fluid. The rigidity and flexibility characteristics of the sheath material is dependent on the specific characteristics desired of the resultant sheathed wick as well as the particular type of wick material employed. For example, when a granular type porous media is employed as the wick material, it is preferred to employ a substantially rigid protective sheath to maintain the uniformity of distribution of the granules since any disturbance of the granular media effects a substantial change in the capillary action and absorption rate of the fluid. Since fibrous type wicking materials such as paper, for example, have a more permanent and elastic physical structure, sheathing materials of a semi-rigid or flexible nature can be satisfactorily employer for covering the exterior of the work material. For this purpose, any one of a number of plastic film materials such as polyethylene, polypropylene, polyvinyl polymers or copolymers such as polyvinyl chloride, polyvinyl acetate, polyvinylidene chloride, polyethylene as well as composite sheets such as polyethylene terephthalate (Mylar) and polyethylene, for example, can be satisfactorily employed. Of the foregoing materials, a composite sheet comprising a sheet of Mylar and polyethylene constitutes the preferred material for sheathing the wick.

A covering sheath of sufficient translucency or transparency is employed to allow visual examination of the length of penetration and progression of the fluid, fluid component, or indicator condition through the wick material as is necessary in some indicator devices. In indicator devices wherein an electrical current or an electrical circuit is completed or a hidden indication is desired on the completion of the measuring function, opaque covering materials can be employed if desired, since visual examination of the wick ordinarily is not necessary under such circumstances.

The protective sheath is applied to the porous wick material in a manner so that it is disposed in intimate contact with side surfaces thereof. The intimacy of contact between the sheath and the side surfaces of the porous wick is critical since any substantial space or gap left between the exterior surfaces of the wick material and the overlying sheath material will itself serve as a capillary causing a substantial deviation in the controlled wicking characteristics of the sheathed wick.

A variety of coating techniques can be employed to sheath the wick wherein the sheating material is disposed in intimate contact with the side surfaces of the wick material. When a thermoplastic film material is employed such as cast transparent polyvinyl chloride film, for example, for sheathing a fibrous wick material such as cellulosic or acrylic fibrous paper, it is preferred to laminate the wick material between a pair of plastic films under heat and pressure effecting fusion and bonding of the films to each other and to the surfaces of the wick material. The use of pressure during the laminating operation is preferred since a large proportion of the air entrapped within the porous structure of the fibrous wick material can be expelled during the sheathing operation.

Alternatively, the wick material can be coated either by dipping or spraying the surfaces thereof with a high solids content thermoplastic resin material which is controlled in viscosity and composition so as not to incur appreciable penetration or blocking of the interior porosity of the wick mateiral. After dipping or spraying the coated wick material can thereafter be dried to evaporate all of the solvent therefrom leaving an impervious residuary coating of the plastic material. Similarly, the exterior surfaces of the wick material can be coated by conventional roller coating techniques of the types well-known in the art to effect a uniform impervious film on the exterior surfaces thereof. Adhesive materials applied to the inner faces of the covering material can also be employed, such as pressure-sensitive adhesives of the types well-known in the art and including natural and synthetic rubbers, for example, which effect tenacious bonding of the covered sheaths to the surfaces of the wick and to each other forming a tenaciously bonded and sealed sheath. In either event, the conditions of the coating technique employed are controlled so as to produce a sheathed wick having the desired pore size and resultant porosity to produce the desired absorption of the selected fluid.

As an example of a liquid coating technique, a vinyl copolymer resin commercially designated as Resyn 33–8012, available from the National Starch & Chemical Corporation, was applied to the surfaces of an acrylic plastic fibrous paper available from Hurlbut Paper Company, designated as 922B, which had a thickness of about 0.010 inch. The plastic coating was applied by means of dipping, and thereafter the coated paper was dried at room temperature until substantially all of the water was removed leaving a residuary impervious film over the entire surface thereof.

In the formation of indicator devices wherein the wick material is mounted on a backing such as paperboard, for example, the surface of the paperboard is provided with a coating of an impervious material such as a synthetic plastic material, for example, and a wick material and an overlying plastic film is thereafter applied forming a laminated structure. Lamination under such conditions can be varied so as to provide for the inclusion of integral reservoirs for the liquid on the card-type indicator as will be subsequently described in detail. Alternatively, indicator devices can be made by the direct lamination of two plastic film materials wherein calibration tables are applied to the plastic film, directly on the wick, or on a separate chart appropriately positioned adjacent to the porous wick material and laminated integrally between the plastic sheets forming an accurate measuring indicating device.

Referring now in detail to the drawings, and as may be best seen in FIGURES 1 through 10, a typical sheathed wick construction is illustrated comprising a porous capillary or wick material 50 enclosed within an impervious protective sheath 52 which is disposed in intimate contact with the exterior surfaces of the wick material 50. A sheathed wick 54 is illustrated in FIGURES 1 and 2 wherein the wick material 50 is laminated within the protective sheath 52 forming a sheathed wick wherein both ends of the wick material are enclosed within the sheath. This construction prevents any contamination or inadvertent absorption of a fluid by the wick material prior to use. At such time that the sheathed wick 54 is to be employed for a measuring function, the lower end thereof, as well as the upper end, if desired, can be simply cut off by means of scissors, for example, along a dotted cutoff line indicated at 56 rendering the sheathed wick operative on immersion or contact with a fluid to be absorbed to directionally guide the absorbed fluid longitudinally along the wick.

An alternate satisfactory construction of a sheathed wick 58 is illustrated in FIG. 3 wherein the wick material 50 thereof projects a distance beyond the lower open end of the protective sheath 52. The sheathed wick 58 is also provided with suitable calibrations 60 extending therealong enabling a simple visual translation of the length of penetration of a fluid, an indicator, or a component of the fluid, along the wick material into the appropriate measuring unit. Since the sheathed wicks of types shown in FIGURES 1–3 can be made of any predetermined sensitivity, and accordingly can be employed with a variety of different fluids, it is also contemplated that the calibrations 60 can be positioned on the wick material, on the sheath extending longitudinally of the wick material, or on an independent scale laminated between the films comprising the sheath, so as to subdivide the length of the wick into 100 parts each representing 1% of the length of the wick material. In this way, the depth of penetration of a liquid or a component thereof or an indicator therein can be interpreted by a suitable calibration chart graphically portraying the performance of specific fluid in terms of the percentage indication on the wick material.

The sheathed wick 54 as shown in FIGS. 1 and 2 and the sheathed wick 58 as shown in FIG. 3, can be provided, if desired, with a venting aperture 62 as shown in the sheathed wick 64 illustrated in FIG. 4. The venting aperture 62 is disposed in communication with the upper end of the wick material 50 and the surrounding atmosphere enabling any entrapped air and/or vapors resulting from the evaporation of the absorbed liquid to be vented to the atmosphere. Another alternate satisfactory venting aperture 66 is illustrated in the sheathed wick 68 shown in FIGS. 5 and 6. In this case the venting aperture 66 extends longitudinally of the wick material 50 having the upper end portion thereof as viewed in FIG. 5 disposed in communication with the upper end of the wick material and the lower end thereof disposed in communication with the atmosphere adjacent the exposed end of the wick material. The diameter of the venting aperture 66 is such that it possesses a relatively low capillary action and the immediate positive pressure applied to any entrapped air or vapors forced upwards through the wick material developed by the advancement of the liquid front therethrough are vented out the lower end of the venting aperture 66 even though it may be immersed in a suitable test solution and simultaneously prevents any inward flow of liquid into the venting aperture 66.

The desirability of employing a vented or non-vented sheathed wick construction depends on the specific use to which the sheathed wick is to be employed, the particular method by which it has been coated resulting in variations in the amount of air expelled from the pores thereof, the volatility characteristics of the liquids to be absorbed, and the specific properties and characteristics of the wick material. In either event, the capillary or wicking action of the sheathed wick will be constant for each specific type and construction and can be accurately correlated with any particular parameter to be measured to achieve accurate results.

The sheathed wick constructions shown in FIGURES 1 through 6 are particularly applicable to a manufacturing process wherein individual strips of the wick material 50 are sheathed within the protected sheath 52. The sheathed wick comprising the present invention can also be manufactured in the form of a continuous strip such as a sheathed strip 70 shown in FIG. 7 incorporating a strip of the wick material 50 laminated within the protected sheath 52. The sheathed strip 70 can thereafter be cut along the dotted lines indicated at 72 spaced at any desired increment forming a sheathed wick 74 as shown in FIG. 8 of any desired length and having the upper and lower ends thereof exposed. Similarly, a sheathed strip 76 as shown in FIG. 9 can be manufactured in any desired lengths by employing a strip of the wick material 50 sheathed within a strip of protective sheathing 52 and formed so as to incorporate a longitudinally extending aperture 78 therealong. The sheathed strip 76 can be cut along the dotted cutoff line 80 indicated in FIG. 9 to any desired lengths and thereafter employed for making vented wicks and indicator devices incorporating an integral liquid reservoir as will be subsequently described in detail. It will be understood that any desired number of wicks can be sheathed simultaneously in spaced side by side relationship.

Still another alternate satisfactory wick construction is illustrated in FIGS. 11 and 12 wherein a composite sheathed wick 82 is shown employing two strips of the wick material 50 which are positioned in spaced overlying relationship and are separated by an intervening plastic film 84 over which the protective sheath 52 is disposed. The composite sheathed wick 82, by the use of two or more wick materials 50 having different controlled absorption characteristics, can be employed for simultaneously determining two or more conditions of a test fluid being analyzed or provide means for obtaining an accurate analysis of a particular characteristic of a fluid having an unknown concentration or characteristic. For example, one of the wick materials 50 of the composite sheathed wick 82 can be impregnated with a suitable anionic exchange resin and a suitable color indicator and the other wick material can be impregnated with a suitable cationic exchange resin and a suitable color indicator to accurately determine the alkalinity or acidity of an unknown test solution.

The wick material 50 as employed in the sheathed wick constructions shown in FIGURES 1 through 12, are of a rectangular configuration and of a substantially uniform cross section. Controlled variations or changes in the cross sectional area, the porosity, and the specific construction of the wick material can be made in accordance with the wick material configurations shown in FIGS. 13 through 20. By virtue of these configurations, variations can be obtained along each incremental length or section of the wick material to achieve controlled changes or predictable changes in the absorption characteristics thereof.

A porous wick maaterial 86 is shown in FIG. 13 comprising an enlarged rectangular upper or tank portion 88 integrally connected to a smaller rectangular feeder portion 90 connected substantially to the lower center portion thereof. A configuration of the porous wick material 86 as shown in FIG. 13 is adapted to be laminated within a suitable protective sheath and is particularly suitable for use in the analysis of fluids having a relatively low concentration of the specific component to be measured enabling a large volume to be absorbed in the tank portion 88 providing a relatively accurate reading even for relatively small concentrations. The configuration further provides a more convenient and compact wick construction which is faster in filling than a longer wick having a constant cross sectional area throughout its length and which is of equal total absorptive volume.

Another alternate configuration of a wick material is illustrated in FIG. 14 where a porous wick material 92 is illustrated having divergent side edges forming therewith a wick material of progressively increasing cross sectional area in the direction of the absorption of the fluid. The advantages provided by the porous wick material 92 are similar to those obtained in the porous wick material 86 shown in FIG. 13.

A porous wick material 94 is shown in FIG. 15 which is of a symmetrically tapered configuration provided with arcuate curved side edges formed in an exponential curve effecting a predictable rate of change in the absorbing characteristics of the porous wick material throughout its entire length. Still another porous wick material 96 is illustrated in FIG. 16 which comprises an alternate form of the porous wick material 86 shown in FIG. 13. The porous wick material 96 as shown in FIG. 16 comprises an upper or tank portion 98 which is of a porosity and has absorption characteristics different than a feeder wick portion 100 positioned in intimate contact therewith and adapted to transfer fluid absorbed by the feeder wick to the tank portion 98. For absorption of equivalent volumes the construction of the porous wick material 96 provides for quicker absorption in a relatively short length since a more porous or thicker tank portion 98 is employed, to provide a subsequent measuring indication upon the fluid absorbed therein, to provide for a composite wick having different chemical treatments applied to the tank portion and the feeder portion enabling greater flexibility and versatility in the analysis and measuring functions.

Another alternate satisfactory configuration of a porous wick material is illustrated in FIG. 17 wherein a porous wick material 102 is illustrated comprising an enlarged feeder portion 104 connected to or disposed in intimate contact with a smaller measuring portion 106. The lower feeder portion 104 can be of a higher density than the measuring portion 106 so as to act as a pressure buffer to absorb the impact of a pressurized fluid applied to the lower open end thereof when enclosed in a protective sheath thereby preventing any deviation from its normal absorptive characteristics. Alternatively, the feeder portion 104 can simply be employed as a reservoir for supplying a fluid to be tested to the measuring portion 106. The feeder portion 104 can also serve as a chemical filter to remove preselected components of a fluid to be absorbed so as to render the subsequent measurement of the transmitted fluid or component thereof to the measuring portion 106 of the wick more readily measurable. The feeder portion 104 can also be employed as a physical filter to remove suspended solids in the fluid to be analyzed or measured, which would otherwise contaminate, plug, or affect the accuracy of the measuring indication as indicated by the measuring portion 106 of the porous wick material 102.

A porous wick material 108 is shown in FIG. 18 which is of a uniform rectangular configuration but incorporates a section bounded by the dotted lines 110 having absorbing characteristics different from the balance of the wick material. For example, the section bounded by the dotted lines 110 can be physically compressed to increase the density thereof and thereby produce a slower rate of absorption which can be employed to absorb the pressure of the initial flow of a fluid applied to the open end of the wick material so as to prevent a deviation from the normal absorbing characteristics of the balance of the wick.

A porous wick material 112 is illustrated in FIG. 19 comprising a circular configuration which is adapted to be enclosed within a protective sheath, a portion of which is perforated to admit a suitable fluid to be absorbed by the wick material. For example, an opening can be provided in a protective sheath thereover at substantially the center of the circular porous wick material 112 whereby absorption of the fluid would take place in a radial direction outwardly toward the periphery thereof whereby the indication provided would be in the form of one or more substantially concentric rings.

The porous wick material 114 illustrated in FIG. 20 comprises a sector of the porous wick material 112 shown in FIG. 19. The fluid to be tested conventionally would be admitted to the pointed end of the porous wick material 114 and be absorbed upwardly as viewed in FIG. 20, producing an absorption effect similar to that obtained by the porous wick material 92 shown in FIG. 14.

Sheathed wicks of the general type shown in FIGURES 1 through 12 employing a porous wick material having a rectangular configuration or an irregular configuration such as shown in FIGS. 13 through 20 can be satisfactorily employed for the performance of a variety of different analytical measurements. In accordance with the practice of the present invention, analytical analyses performed by employing a sheathed wick having a construction as hereinbefore described, enables relatively unskilled persons to perform accurate analytical analyses of a variety of different fluids which heretofore could only be accomplished by employing relatively complex laboratory analytical methods. The sheathed wick can be employed to separate selected components of an absorbed fluid by virtue of the surface condition of the porous wick material which causes an adhesion of a thin molecular layer of the component as the fluid is absorbed by the wick. Components of the fluid are accordingly separated by the differences in their affinity for adhesion to the surfaces effecting a progressive absorption of the component as the fluid advances through the wick.

Alternatively, the porous wick material can be impregnated with suitable reactive agents effecting a controlled preselected reaction with one or more selected components of the fluid and suitable indicators may be incorporated to visually indicate the amount of the reactive impregnant which has reacted with a component of the fluid or the proportion of unreacted impregnant left when the liquid has attained the end of the wick material giving thereby a direct quantitative indication of the amount of the component present in the fluid.

The reactive impregnants may be immovably affixed to the surfaces of the porous wick material whereupon reaction thereof with a selected component or components in the absorbed fluid the reaction product remains stationarily affixed relative to the position of the reaction in the wick. Alternatively, the reactive impregnant can be movably disposed within the porous wick material whereupon reaction with one or more components of the absorbed fluid, the reaction product travels with the fluid as it advances through the wick.

An example of an immovably reactive impregnant is one which comprises a portion of a porous wick material itself such as by chemically modifying the characteristics of a cellulose base capillaceous material rendering the surfaces thereof immovably reactive with components of the fluid absorbed. This can be achieved by incorporating suitable ion exchange resins on the surfaces of the wick material or employing such ion exchange resins substantially as a porous capillary material itself (such as ion exchange paper) rendering the components reacted therewith immobile as the fluid passes by. Suitable indicators incorporated within the porous wick material of selected color characteristics can be employed to visually indicate the reacted or unreacted portion of the wick material which can suitably be translated to the amount of the component or components in the absorbed fluid.

In the performance of analyses of the concentration of a solute present in a solvent, for example, a sheathed wick of the general type shown in FIGURES 1, 3 and 4, and 5, can be employed wherein an exposed end of the wick material 50 is immersed in the test solution and the solute and solvent is absorbed into the wick. The ratio of distances of absorption of the solute and solvent is proportional to the quantity or concentration of the solute present in the solution. This ratio remains essentially constant irrespective of the amount of fluid absorbed and, accordingly, the length of the wick is immaterial with respect to the concentration and is only useful in obtaining the desired accuracy of the reading resulting therefrom. In instances where a high degree of accuracy is required, a relatively long wick or a wick material having a specific shape such as a circular shape, as shown in FIG. 19 can be employed since a greater quantity of fluid is absorbed over a greater area or a longer distance. To enable simple conversion into conventional units, the wick material or the sheath adjacent to the wick material can be suitably calibrated in the particular measuring system desired so as to directly indicate the percent, molarity, etc. of the solute present in the solvent and/or solution.

The foregoing method is directly applicable for the analysis of the concentration of solutions containing a colored solute therein. For example, in the measurement of the concentration of a dye solution such as malachite green dissolved in water, the height of rise of the green dye in a calibrated sheathed wick can be converted into a direct measurement of its concentration in the water solution.

When it is desired to measure the concentration of a solute in a solution wherein the solute or combination of components comprising the solute are colorless, it is preferred to treat the wick material with an impregnant which is sensitive to the component or the components of the solute being measured. As an example, in the measurement of the concentration of colorless acidic or basic solutions such as hydrochloric acid or sodium hydroxide, for example, a suitable acid-base indicator such as methyl red, phenolphthalein, or the like, is impregnated in the wick whereby the ratio of the distance of penetration of the solute-solvent is rendered visible by the change in color of the indicator.

In some cases it may be desirable to add two or more impregnants to the porous wick material. As an example, in the measurement of the concentration of a salt solution such as sodium chloride, for example, the wick material can be impregnated with a reactant such as silver nitrate in addition to an indicator such as dichlorofluorescein. As the test solution is absorbed into the porous wick material, a chemical reaction takes place between the sodium chloride and the impregnants which effects a change in the color of the indicator to a height in the wick material corresponding to the concentration of the salt in the solution which can be appropriately calibrated in any one of a number of conventional measuring systems.

Sheathed wicks employed for analytical purposes can also employ a porous wick material wherein only a portion of the wick material, namely, one end thereof, to which the initial test solution is to be applied, is treated with a mobile impregnant or a group of mobile impregnants which migrate through the pores of the wick material in response to the advance of the fluid therethrough a distance related to the specific characteristics of the fluid being measured. For example, the concentration of a dilute hydrochloric acid solution can be accurately measured by employing a wick material comprising, for example, a Whatman No. 100 paper impregnated at the inlet end thereof with an indicator dye such as bromothymol blue. By immersing the sheathed wick such that the treated end thereof is positioned in the acid solution, movement of the indicator through the wick material is effected and the distance of travel from the end of the wick can be directly calibrated to indicate the specific acidity of the solution.

As hereinbefore mentioned, the porous wick material may also be treated or impregnated with suitable reactive materials which are selectively reactive with one or several components of the fluid absorbed therethrough but which remain essentially fixed in position along the path of travel of the fluid thereby causing the component or the components reactive therewith to become essentially fixed in position either on or in the vicinity of the stationary fixed impregnant. Examples of such immobile or stationary impregnants are ion exchange resins imbedded in a porous capillaceous wick material such as Reeve Angel SB–2 anion exchange paper and Reeve Angel SA–2 cation paper, or Whatman amino ethyl cellulose anion exchange paper. In the Whatman anionic exchange paper, the cellulose molecule itself is modified so as to act as an ion exchanger. In accordance with this technique, the anions or cations in the fluid absorbed in the wick are progressively removed by the mechanism of ion exchange and the depth of penetration and reaction of the anions at the time the fluid completes penetration of the porous wick material or a preselected point thereon is proportional to the concentration of the anions in the test fluid.

As a specific example of the foregoing analytical sheathed wick employing an anionic exchange wick material, a sheathed wick is prepared employing a strip of Reeve Angel SB–2 anionic paper which is preliminarily converted to the hydroxide form and suitably sheathed within a protective sheath. The exposed end of the sheathed wick can thereafter be immersed in a suitable acid solution such as hydrochloric acid, for example, and the inclusion of an acid indicator in the wick material effects a vivid visible indication by a change in color of that portion of the wick which has been saturated with or fully reacted with the ions of the test solution. The saturated or fully reacted portion of the wick contains unreacted anions therein supplied by the upwardly moving test solution providing a color indication up to an interface spaced from the forwardmost portion of the advancing liquid front which is substantially neutral and devoid of indicating ions which have previously been removed by the ion exchange resin. An accurate indication of the concentration of the hydrochloric acid as indicated by the ratio of the contrasting colored portions of the wick is made at the time that the substantially neutral liquid attains the end portion of the wick material or a preselected point thereon.

The advantage of employing an ion exchange paper serves to decrease the height of the rise of acid in the wick material in comparison to a non-ionic exchange wick material since the ion exchange resin concentrates the acid into a smaller area and, accordingly, higher concentration test solutions can be accurately analyzed with a relatively smaller sized wick.

Sheathed wicks of the general type shown in FIGURES 1–12 can also be satisfactorily employed for the analysis of components in gases. For this purpose a sheathed wick 116 of the type shown in FIGS. 33 through 35 is employed which may comprise a porous wick material 118 such as a Whatman No. 100 filter paper, for example. In an analysis for the determination of the total amount of water vapor or moisture in air, for example, the porous wick material 118 of the sheathed wick 116 can be impregnated with a hygroscopic material such as lithium chloride or calcium chloride, for example, containing a water sensitive indicator such as the Karl Fischer Reagent.

The upper end of the sheathed wick 116 is provided with a suitable port 120 in which the inlet end of a suitable syringe or pump 122 is inserted for drawing a preselected volume of air through the wick material 118. As the air is drawn through the wick material, the water vapor therein is continuously absorbed commencing at the inlet end portion of the wick containing the hygroscopic material and a color indication is provided. Since absorption occurs commencing at the inlet end of the wick and moving upwardly as saturation of the hygroscopic materially progressively occurs, the progressive linear travel upwardly of the color indicator along the length of the sheathed wick 116 can be directly correlated to the amount of moisture in the air for a given volume of sample. For this purpose, convenient calibrations 124 can be applied to the wick material 118 or to the protective sheath 125 therearound which can directly be interpreted in terms of weight percent, percent humidity, etc. for a specified volume of sample.

Another specific analytical use of the sheathed wick relates to the determination of the freshness of milk at the time of pickup from dairy farmers. Because of the complex analytical procedures and equipment heretofore required to effectively evaluate the freshness of milk, each batch of milk has to be maintained in a segregated condition during the pick-up route until appropriate analyses can be conducted in the dairy laboratory. Alternatively, the consolidation of the individual milk batches during a pick-up route has resulted in the contamination of the entire tank-wagon batch by dumping one or more batches of sour or diluted milk therein because of lack of analysis or impracticability of analysis of milk along the pick-up route. In the specific instance of evaluating the freshness of milk, the status of bacteriological development in the milk is reflected in the acidity of the milk wherein a progressive deterioration of the milk results in a corresponding progressive increase in the acidity thereof. In accordance with the present invention, a sheathed wick can be employed of the general type shown in FIGURES 1–12 wherein accurate analysis of each batch of milk can be simply achieved by the truck driver assuring appropriate freshness before the dumping thereof into the consolidated batch.

As a typical example of a milk freshness indicator, a sheathed wick of the type shown in FIGURE 1 is prepared by enclosing a strip of a capillaceous paper commercially designated as Grade SB–2 available from the Reeve Angel Paper Company which is conveniently cut into strips of 3½ inches in length by ⅛ inch wide. The paper is preliminarily treated with a 10% solution of sodium hydroxide in order to convert the paper additives such as an Amberlite resin into the hydroxide form which are thereafter washed out with clean, clear water and allowed to dry. The dry treated paper is thereafter impregnated with a 1% solution of methyl red indicator in an alcohol solvent and allowed to dry. The strip of paper is then laminated between two sheets of 8 mil polyvinyl chloride plastic film forming an integrally united impervious protective sheath therearound.

On testing of a batch of milk, the protective sheath is cut off along the dotted line 56 of the sheathed wick 54 illustrated in FIGURE 1, leaving a net length of 3 inches and is immersed in the milk. The height of travel of the pink area of the wick material when the closed end of the wick was reached by the solvent indicates the proportion of acid, and accordingly the freshness of the milk. Calibration of the specific wick material with acidic solutions of known and progressively increasing acidity enables calibration of the wick wherein the distance that the edge of the colored area is spaced from the end of the wick can readily be translated in terms of the freshness or bacteriological growth content of the milk providing a quick, simple and accurate analysis thereof.

The foregoing technique can be employed for analyzing any particular liquid by preparing a series of test solutions of varying concentration or acidity, for example, and then establishing the relationship of height of travel of the colored area with respect to the end of the wick for each of the different solutions. The porous wick material can be made of alternate satisfactory shapes such as a circular shape as shown in FIG. 19 or a composite shape as shown in FIG. 17 wherein the feeder portion 104 serves as a physical filter to remove suspended materials from the liquid preventing a plugging of the measuring portion 106 thereof. A series of sheathed wicks can thereafter be calibrated in accordance with the relationship established and imprinted in a manner similar to the calibrations 60 on the sheathed wick 58 shown in FIG. 3 and can be employed thereafter for accurately analyzing the concentration or acidity, as the case may be, of a series of liquids.

The sheathed wick comprising the present invention can also be provided with an integral reservoir for supplying a fluid to the porous wick material. A construction of this type is particularly adaptable for indicator devices which are applicable for the measurement of such parameters as time, time-temperature relationships and the like, wherein the fluid supplied to the porous wick material possesses controlled physical characteristics. An indicator device 126 is shown in FIGS. 21 and 22 comprising a porous wick material 50 enclosed within a protective sheath 52 formed at the lower end thereof with a liquid reservoir 128 adapted to contain a suitable liquid for absorption by the wick material. The liquid reservoir 128 is disposed in direct communication with the end of the wick material adjacent thereto whereby the absoprtion of the liquid into the wick, commences as soon as the liquid is introduced in the reservoir or when it attains a liquid state and can be absorbed. To delay initiation of the wicking action, the liquid can be introduced in the form of a frozen pellet for example which, on subsequent melting thereof immediately initiates absorption and a suitable measuring function of the device. It will be understood that a gelatin capsule or other suitable means can be employed to introduce the liquid.

The particular construction of the indicator device 126 shown in FIGS. 21 and 22 is particularly applicable to freshness indicators of the type adapted to measure the wholesomeness or freshness of perishable articles which are applied to the article at the time of packaging. The wicking action of the wick material 50 and the specific physical properites of the liquid contained in the reservoir 128 and variation of these properties with respect to temperature, must be carefully tailored to the specific deterioration curves or aging characteristics of a particular material to which the indicator device is to be applied. By controlling the characteristics of the wick material and the liquid, the ideal time-temperature sensitivity of the indicator device can be achieved whereby the freshness or shelf life of any product which is dependent on the time and thermal environment to which it is subjected, can be accurately measured.

A simple application of this principle employing a remote source of supply of the liquid is that of employing the wick to evaluate the degradation of frozen foods caused by periodic intervals of thawing followed by the freezing. By embedding the open end of a sheathed wick in a frozen food package, the melted water or other liquids formed the instant thawing occurs causes initiation or resumption of the upward rise of the liquid in the wick material at a rate proportional to the temperature of the liquid and which advance will subsequently cease when the package is refrozen. Accordingly, an accumulation of thawed periods will be permanently recorded on the indicator device reflecting the freshness of the package at the time of use.

The freshness indicator shown in FIGS. 21 and 22 employs a liquid having selected physical properties in the reservoir 128. A typical use of such a device is for the determination of the rate of deterioration of fresh beef, for example, wherein the bacteria causing the degradation multiply according to the temperature at which the meat is maintained and the duration of time at that temperature. It is now known that there is a direct correlation between the bacteria population and the suitability of beef for consumption. Accordingly, a freshness indicator can be devised by matching the time temperature bacteria growth curve of beef or any other food product with a selected combination of a wick material and liquid so that when the liquid attains the upper end of the wick or a preselected point thereon, the maximum tolerated spoilage has occurred.

In the specific example of a freshness indicator for beef, having an estimated maximum bacteria content tolerable of about one million organisms per square centimeter, a wick material was prepared comprising a Whatman No. 50 filter paper which was cut in rectangular strips 1½ inches long and ⅛ inch wide and impregnated with a .5% solution of potassium thiocyanate, dried, and sheathed within a polyvinyl chloride film having a thickness of 8 mils by employing a dielectric heated laminating technique and utilizing a pressure of 60 p.s.i. As hereinafter explained in detail, the appropriate liquid required to achieve the desired rate of movement through the wick is derived from establishing the constant K for the wick material under the specific laminating or sheathing conditions and establishing a curve relating to the maximum height of absorption desired versus the time of absorption in hours. Thereafter the ratio of surface tension to viscosity is established for each particular temperature and a liquid is formulated corresponding to these characteristics. In accordance with this procedure, a suitable liquid for determining the freshness or decay rate of fresh beef comprises a blend containing 50% by volume glycerine, 40% ferric chloride, and 10% water.

Having produced a liquid whose advance through a wick follows the general bacteria growth curve which applies to the spoilage of food products, it is possible by changing a constant such as wick composition, density and/or impregnation, size of pores, and wick geometry to match the bacteria growth curve of many food products. The liquid may also be adjusted in physical characteristics but does not necessarily have to exactly match the bacteria growth curve characteristics. A liquid which approximates these characteristics can be also satisfactorily employed and provide a measure of safety.

A time-temperature sensitive indicator is also applicable as a dosage indicator to anti-microbiological drugs which decrease in efficiency and frequently are affected adversely by their age and storage temperature. Similarly, the aging characteristics of other materials and products not related to bacteria growth such as photographic film, for example, can also be matched by selecting the appropriate wick material and liquid combination.

An alternate satisfactory indicator device 130 is illustrated in FIG. 23 wherein a liquid reservoir 132 formed in the protective sheath 52 is connected to one end of the porous wick 50 by means of a conduit 134 which is adapted to be closed when the indicator device is folded along the dotted line indicated at 136. By virtue of this construction, the unfolding of the indicator device serves to open the conduit 134 enabling the liquid in the liquid reservoir 132 to become absorbed in the wick material 50 initiating the measuring function at the desired time.

An alternate satisfactory valve means for an indicator device 138 is illustrated in FIG. 24 wherein a conduit 140 connecting a liquid reservoir 142 formed in the protective sheath is provided with a partially sealed section indicated at 144 preventing entry of the liquid to the absorptive end of the wick material 50. The indicator device 138 is activated by pressing the liquid reservoir effecting a rupture of the sealed section 144 whereby the liquid contained therein contacts the adjacent end of the wick and is progressively absorbed upwardly through the wick material.

Still another alternate satisfactory valving means is illustrated in an indicator device 146 shown in FIG. 25 employing a fusible plug indicated at 148 positioned in a conduit 150 connecting a liquid reservoir 152 with one end of the porous wick material 50. The fusible plug 148 can comprise any suitable material such as a wax or a blend of waxes which are selected to melt or fuse when a preselected temperature is attained. On fusion of the fusible plug 148 the liquid contained in the reservoir 152 flows upwardly through the conduit 150 and is progressively absorbed in the wick material 50.

As noted in FIG. 25, the conduit 150 is provided with a side branch indicated at 154 which may be vented if desired and which preferably is of a progressively decreasing diameter and of a smaller capillary size than the conduit 150 so as to preferentially attract the molten fusible plug and cause it to become deposited therein, thereby avoiding contamination and restriction of the porous wick material 50. The construction of the indicator device 146 shown in FIG. 25 is particularly suitable for use as an elapsed time-indicator which is adapted to measure the elapsed time since a preselected temperature has been exceeded.

Still another suitable valving means is shown in an indicator device 156 illustrated in FIG. 26 employing a frangible plug 158 disposed in a conduit 160 connecting a liquid reservoir 162 to one end of the porous wick material 50. The frangible plug 158 may comprise any suitable fragile material which on the application of pressure thereto disintegrates so as to enable the liquid from the reservoir to pass upwardly through the conduit 160 and become progressively absorbed in the wick material. The lower portion of the wick material 50 may comprise a section adapted to function as a physical filter for removing the fragments of the disintegrated frangible plug to avoid contamination and plugging of the wick material.

Another indicator device 164 is illustrated in FIGS. 27 and 28 wherein a conduit 166 connecting a liqiud reservoir 168 to the wick material 50 is closed by a resilient biased clip 170 removably positioned thereon serving as a valve for restricting the flow of liquid from the reservoir to the wick material. On removal of the clip 170 the liquid is permitted to flow upwardly and become absorbed in the wick material initiating the measuring function. It will be appreciated that the protective sheath 52 of the indicator device 164 must be of a flexible nature to enable compression thereof by the clip 170 effecting substantially complete sealing of the conduit 166.

Still another alternate satisfactory valving mechanism for selectively releasing liquid to initiate absorption in the wick material is illustrated by an indicator device 172 shown in FIGS. 29 and 30. The indicator device 172 as shown incorporates a liquid reservoir 174 which is connected by means of a conduit 176 to one end of the porous wick material 50. A removable plug 178 is removably positioned in the conduit 176 and effects substantially complete sealing of the conduit. At such time that it is desired to initiate a particular measuring function, the removable plug 178 is withdrawn by means of a pull string 180 enabling the liquid in the reservoir 174 to travel upwardly and become progressively absorbed in the wick material 50.

Another satisfactory construction of an indicator device 162 is illustrated in FIGS. 31 and 32 which comprises a composite construction in comparison to the integral construction of the indicator devices shown in FIGS. 21 through 30. The indicator device 182 is adapted to be constructed from a continuous sheathed strip such as the sheathed strip 76 illustrated in FIGS. 9 and 10 to one end of which a cap 184 is heat sealed or otherwise adhesively fastened. The cap 184 is formed of a flexible material similar to the plastic film of which the sheath 52 enclosing the porous wick material 50 is comprised as hereinbefore set forth. The cap 184, in the specific construction shown, is formed with a suitable cavity indicated at 186 which forms a communicating conduit between the upper end portion of the wick material 50 and the venting aperture 78 extending longitudinally of the wick material. With only the cap 184 secured thereon, the resultant composite wick resembles and functions the same as the integral sheathed wick 68 shown in FIG. 5.

A base 188 can be similarly affixed to the other end of the sheathed wick and securely sealed or adhesively fastened thereto which is provided with a liquid reservoir 190 adapted to be disposed in communication with one end of the porous wick material 50 and the venting aperture 78 through a suitable connecting conduit 192. The conduit 192 can be provided with suitable valve means of the general type illustrated in FIGS. 21 through 30 for selectively introducing the liquid contained in the liquid reservoir 192 one end of the porous wick material to initiate a measuring function. The indicator device 182 further illustrates a method of venting the wick whereby the opposite end of the wick is vented to the liquid reservoir so as to provide for equalization of pressure of any vapors or any entrapped air in the wick material during the absorption of the liquid therethrough.

It will be apparent from the foregoing that suitable indicator devices can be constructed to measure a particular parameter by controlling the uniformity or variation in the wicking action or rate of travel of the liquid along the porous wick material as a result of variations in the geometry of the wick as well as in the variation of its porosity along sections thereof to achieve the desired results. The selection of the particular wick material and liquid to accomplish a particular measuring operation is facilitated by employing the following mathematical relationship:

$$\frac{h^2}{t} = \frac{s}{n}K$$

wherein:

$h$ = the distance or height of the liquid in the wick
$t$ = the time
$s$ = the surface tension of the liquid
$n$ = the absolute viscosity of liquid absorbed, and
$K$ = a constant dependent on the chemistry and structure of the porous wick material In accordance with the foregoing relationship, a wick having known characteristics and a selected liquid whose physical characteristics are known, can be employed and correlated together enabling accurate calibration of an indicator device to measure parameters such as time, temperature, time-temperature relationships, viscosity, surface tension, as well as for various qualitative and quantitative analyses, as the case may be.

Any one of a number of suitable fluids can be employed to achieve the desired absorption by the wick material to provide measurement of a specific parameter. Fluids which can be satisfactorily employed include those which have a viscosity which permits absorption by the wick. Heating can reduce liquid viscosity and permit absorption at a higher rate if the temperature does not exceed the thermal tolerance of the wick and sheath which in the case of some materials and some wicks, for instance, glass fiber paper can exceed 500° F. The liquids can comprise relatively pure compounds or solutions of dissolved salts or liquids therein. Knowledge of the particular constant K of the wick material in combination with the viscosity and surface tension of the liquid as well as variations in the change of the viscosity and surface tension of the liquid with respect to temperatures enables the height and time relationship to be readily calculated in accordance with the foregoing mathematical relationship. In indicator devices wherein a timing function is to be measured it is desirable to employ a liquid which does not materially change with respect to its surface tension and viscosity with changes in temperature. Since most liquids and even silicone liquids change quite markedly in their physical properties with changes in temperature, suitable additives in the liquid or impregnated in the wick material can be employed which maintain substantially constant viscosity and surface tension or maintain the ratio between these two physical properties substantially constant in spite of large fluctuations in temperature. By virtue of this technique, the accuracy of the timing device will be maintained over a thermal environment of a preselected range contemplated.

The effect of vapor pressure of the liquid can readily be controlled by selecting one which has a relatively low vapor pressure in the range of temperatures to be encountered and/or venting the wick to the reservoir or atmosphere. Similarly the density of the liquid does not usually constitute a critical factor since density variations are relatively negligible over the temperature ranges contemplated, such as, for example, from about −20° F. to about 120° F.

Of the foregoing materials, the one of the viscosity of the liquid with respect to the temperature is most critical. One method of insuring a constant viscosity of a liquid over a given temperature range is to maintain a maximum concentration of certain dissolvable materials in the liquid. For example, certain salts such as inorganic salts like lithium chloride or ammonium nitrate, for example, when dissolved in a liquid such as water, for example, at maximum concentration, impart a substantially constant viscosity to the liquid over a wide temperature range. By maintaining maximum concentration of salts, for example, in the liquid throughout a wick length, a controlled rate of absorption can be achieved over a wide temperature range. This can readily be achieved by impregnating the wick material with a sufficient quantity of the dissolvable material to maintain a maximum concentration in the liquid as the liquid proceeds through the wick material and during which time variations in temperature may occur. The liquid itself, preferably would also contain a maximum dissolved concentration of the same material to reduce any time lag resulting from the time required to dissolve the material and to assure constant viscosity during each incremental advancement through the wick.

As a typical example it has been found that lithium chloride in water as the liquid solvent in combination with a sheathed porous wick containing lithium chloride can be constructed to substantially eliminate the temperature effect on viscosity and maintain a predictable travel of the liquid along the wick over the temperature range of 32° F. to 140° F. for a period of 5 days.

It has also been found that a combination of several materials, including soluble and insoluble materials, or a combination of soluble materials that produce insoluble materials, can be constructed in a sheathed porous wick to maintain a predictable travel of the liquid along the wick over a useful temperature range. For example, it has been found that the combination of potassium bromide and potassium nitrate in water as the liquid solvent in combination with a sheathed porous wick can be constructed to maintain a predictable travel of the liquid along the wick over the temperature of 32° F. to 70° F. for a period of 24 hours. It has been found that the more complex combination of calcium chloride,, ammonium chloride, zinc sulfate, and potassium nitrate (which includes the formation of insoluble calcium sulfate) increased the predictable travel of the liquid along the wick to a period of 160 hours over the same temperature range of 32° F. to 70° F.

Preparation of a sheathed wick having a dissolvable substance such as a salt, for example, impregnated in the porous wick material thereof can be simply accomplished by applying a solution containing the salt or salts, for example, to be impregnated, and thereafter drying the impregnated wick material until substantially all of the solvent is removed. It is usually preferred to build up the required amount of salt, for example, in the wick by passing the wick through a series of relatively dilute solutions of the salt, for example, followed by an intervening drying step until the desired residuary salt concentration, for example, is obtained.

In order to improve the readability of an indicator device employing a sheathed wick, the porous wick material can be preliminarily impregnated with suitable color reagents or materials which on contact with the absorbed liquid form color bodies enabling simple visual determination of the length of penetration of the liquid therealong. An example of such a coloring system comprises a porous wick impregnated with potassium thiocyanate and a liquid supplied either from an independent or integrally connected reservoir comprising a water solution containing dissolved ferric chloride. As the liquid is absorbed by the wick, the ferric ion reacts with the thiocyanate to form a deep red-colored compound comprising a complex ion. The distinctive red color travels with the interface giving a pronounced visual indication of the rate of travel and amount of penetration of the liquid. Another suitable coloring impregnant would be a conventional soluble dye which dissolves in the liquid as it advances through the wick. Suitable dyes of this type include Patent blue VS technical, Water violet 4BN technical, Medium green N technical, and the like. The dissolving of the Patent blue dye in water, for example, produces a bright blue distinctive color which generally concentrates at the interface or advancing portion of a liquid producing a bright blue distinctive mark. Alternate suitable indicator dyes can be employed which are invisible in ordinary light but which provide a distinctive color indication when subjected to ultraviolet light, for example, providing thereby a hidden, selectively readable indication.

The sheathed wick construction hereinbefore described having a preselected porosity and geometrical configuration, employed in combination with a liquid of known physical characteristics and modified if desired by incorporating suitable color indicators or impregnants in the porous wick material and dissolved in the liquid to achieve satisfactory indication and viscosity control can be employed for a large variety of different indictor devices several of which are herein specifically described in detail. One useful application of the sheathed wick construction is illustrated by an elapsed time indicator device indicated at 194 in FIGS. 36 through 38 and comprising a capillary material 196 laminated between a pair of plastic films 198 which is formed so as to provide a capsule or reservoir 200 in which a suitable liquid is contained. The reservoir 200 is connected to the feed-end portion of the wick material 196 by means of a small conduit or tube 202 which may be provided with suitable valve means on the opening of which the timing sequence commences. In the specific elapsed time indicator 194 shown in FIGS. 36–38, the tube 202 is provided with a removable plug generally indicated at 204 at the outlet of the reservoir 200 which on withdrawal from a closed position shown in FIG. 37 to an open position shown in FIG. 38 releases the liquid and initiates the timing action.

The wick material 196 is suitably calibrated in appropriate time units such as hours, for example, to indicate the elasped time period since the initiation of the timing cycle. Suitable coloring agents and other impregnants such as the salts hereinbefore described, can be incorporated in the wick material 196 as well as dissolved in the liquid to maintain a substantially constant viscosity-surface tension relationship over the temperature range to be encountered.

Another satisfactory indicator device is illustrated in FIGS. 39 and 40 incorporating therein the principles of the present invention. The indicator device 206 comprises a wick material 208 having the lower end portion thereof connected by means of a tube 210 to a liquid reservoir 212 formed in an overlying plastic sheet 214 tenaciously adhered to a paperboard backing sheet 214 which is provided with an impervious coating on the surface thereof on which the wick material 208 is positioned. The indicator device 206 is provided with valve means comprising a removable plug 216 of the same type employed in the time indicator device 194 shown in FIGS. 36–38 which on movement to an open position initiates the temperture-time measuring function.

Still another typical indicator device generally indicated at 218 in FIGS. 41 and 42 is shown which is operative to generate an electrical signal when the timing function has been completed. The indicator device 218 comprises a sheathed wick material 220, the lower end of which is connected by means of a tube 222 to a reservoir 224 containing an electrolyte. The upper end of the sheathed wick material 220 terminates in a multiple plate battery 226 as best seen in FIG. 42 comprising alternate sheets of copper and zinc, for example, indicated at 228, which are separated by sheets of the porous wick material 230 connected to the principal wick material 220. Conductors 232 are connected to the battery 226 and in turn are connected to a suitable control relay to be energized thereby. Initiation of the timing function, for example, is accomplished by withdrawing a movable stopper 234 to the open position or other suitable valve means effecting a flow of the electrolyte from the reservoir 224 to the inlet end of the sheathed wick material 220. When the electrolyte advances to a position wherein it is absorbed in the sheets of the porous wick material 230 disposed between the metal sheets 228, the circuit of the battery is completed effecting generation of current which passes through conductors 232 to a sensing device connected thereto. Arrangements of this general type have enabled the generation of a signal current at 2.5 volts at the completion of the timing function which can be varied depending on the specific construction of the battery 226.

A similar electrical indicator device generally indicated at 236 is illustrated in FIGS. 43 and 44. The indicator device 236 comprises a sheathed wick material 238 connected at its lower end by a tube 240 to a reservoir 242 containing a suitable electrolyte or other electrically conductive liquid. A pair of electrodes 244a, 244b are disposed in spaced relationship and extend longitudinally along each side of the sheathed wick material 238 as shown in FIG. 43. The electrode 244a is disposed in fixed relationship relative to the wick material 238 whereas the electrode 244b is longitudinally movable adjustably presetting the indicator device to produce a signal after a preselected expired time interval after the timing function has been initiated. The electrodes 224a, 244b are connected to a suitable current source and to a suitable control relay which when the electrolyte advances to a position adjacent to the downwardly extending end of the electrode 244b, completes the circuit and the control relay is energized and is effective to perform the desired control.

Another alternate satisfactory indicator device similar to the indicator device 236 shown in FIGS. 43 and 44 is illustrated in FIGS. 45 and 46 which is operative to complete an electrical circuit on the completion of a predetermined time interval. The indicator device 246 as shown in FIGS. 45 and 46 comprises a sheathed wick material 248 incorporating an electrode 250 which extends longitudinally along one side of the sheathed wick material 248. The upper end of the electrode 250 is connected by a suitable conductor to control relay and a current source which in turn is connected to an alligator-type clip 252. The clip 252 is provided with piercing jaws and is selectively positionable at any preselected position along the length of the sheathed wick material 248. The piercing jaws of the clip 252 are resiliently biased so that when installed at a preselected position is operative to puncture the sheathing material enclosing the wick material 248 and become disposed in conductive contact with the wick material.

Initiation of the timing function is achieved by withdrawing a movable plug 254 releasing an electrolyte or other suitable conductive liquid in a reservoir 256 which is progressively absorbed by the wick material. When the electrolyte attains a position adjacent to the clip 252, a circuit is completed between the clip 252 and the electrode 250 effecting energization of the control relay which in turn is effective to perform the desired control function.

While it will be apparent that the preferred embodiments herein illustrated are well calculated to fulfill the objects above stated, it will be appreciated that the invention is susceptible to modification, variation and change without departing from the proper scope or fair meaning of the subjoined claims.

What is claimed is:

1. A device comprising in combination a porous capillary material characterized by connected voids of sufficiently small size to induce the progressive absorption of a fluid, an impervious covering material enclosing the exterior surfaces of said capillary material and disposed in intimate contact therewith along the entire operative length thereof defining an absorptive cavity of a preselected volume, means defining a reservoir for holding a fluid of controlled properties disposed in communication with a preselected point on said capillary material, said device constructed to provide directional guidance through said absorptive cavity of a fluid flowing from said reservoir into contact with said preselected point on said capillary material.

2. The device as defined in claim 1 wherein said means defining said reservoir comprises a cavity integrally formed in said covering material.

3. The device as defined in claim 1 further including indicating means associated therewith operable in conjunction with the fluid absorbed to evidence a measuring function.

4. The device as defined in claim 1 further including conduit means disposed between said reservoir and said preselected point on said capillary material for conducting fluid from said reservoir to said capillary material.

5. The device as defined in claim 4 wherein said conduit means is integrally formed in said covering material.

6. The device as defined in claim 4 further including valve means for selectively controlling fluid flow through said conduit means from said reservoir to said capillary material.

7. The device as defined in claim 6 wherein said valve means comprises a sealed section of said covering material within said conduit means which is rupturable in response to the application of pressure to the fluid in said reservoir.

8. The device as defined in claim 6 wherein said conduit means is integrally formed in said covering material and said valve means comprises a fold along said covering material extending transversely of said conduit means which on unfolding is operative to open said conduit means.

9. The device as defined in claim 6 wherein said conduit means is integrally formed in said covering material and said valve means comprises a resiliently biased clip removably disposed in overlying clamping relationship over said covering material and said conduit means therethrough effecting closure thereof.

10. The device as defined in claim 6 wherein said valve means comprises a frangible plug sealingly disposed in said conduit means and breakeable upon the application of pressure thereto to open communication of said conduit means between said reservoir and said capillary material.

11. The device as defined in claim 6 wherein said conduit means is integrally formed in said covering material and said valve means comprises a plug removably disposed in sealing relationship within said conduit means and including connecting means connected to said plug and extending through said covering material to the exterior thereof for withdrawing said plug from sealing relationship in said conduit means and opening communication thereof between said reservoir and said capillary material.

12. The device as defined in claim 6 wherein said valve means comprises a plug consisting of a heat fusible material disposed in sealing relationship in said conduit means and operable on being heated above a preselected temperature to fuse and open communication of said conduit means.

13. The device as defined in claim 1 wherein said fluid comprises a liquid having a solute dissolved therein, said capillary material impregnated with said solute for maintaining the concentration of said solute in said liquid at its maximum level over a preselected temperature range thereby controlling the rate of penetration of said liquid through said capillary material.

14. The device as defined in claim 12 further characterized in that said conduit means includes a side branch of a progressively decreasing diameter disposed in communication therewith for preferentially inducing the fused said plug to become deposited therein.

References Cited

UNITED STATES PATENTS

| | | | |
|---|---|---|---|
| 96,664 | 11/1869 | Benedict | 67—73 |
| 1,238,123 | 8/1917 | Freeman | 116—114 |
| 1,278,388 | 9/1918 | Sadlo | 67—74 |
| 2,249,867 | 7/1941 | Snelling | 23—253 |
| 2,601,840 | 7/1952 | Smith et al. | 23—253 |
| 2,708,896 | 5/1955 | Smith et al. | 23—253 |
| 2,785,057 | 3/1957 | Schwab et al. | 23—253 |
| 2,998,306 | 8/1961 | Huyck et al. | 23—254 |
| 3,006,735 | 10/1961 | Jordan | 23—253 |
| 3,011,874 | 12/1961 | Deutsch | 23—253 |
| 3,018,611 | 1/1962 | Biritz | 116—114 |
| 3,051,661 | 8/1962 | Collins | 23—253 |
| 3,067,015 | 12/1964 | Lawdermilt | 116—114 |
| 3,127,281 | 3/1964 | Meyer | 23—253 |
| 3,232,710 | 2/1966 | Rieckmann et al. | 23—253 |

LOUIS J. CAPOZI, *Primary Examiner.*

U.S. Cl. X.R.

23—253; 67—53; 252—408